April 16, 1935. P. M. A. LÉAUTÉ 1,997,937
APPARATUS FOR THE THERMIC TREATMENT OF PULVERIZED LIQUIDS OR SEMILIQUIDS
Filed April 7, 1933 3 Sheets-Sheet 1
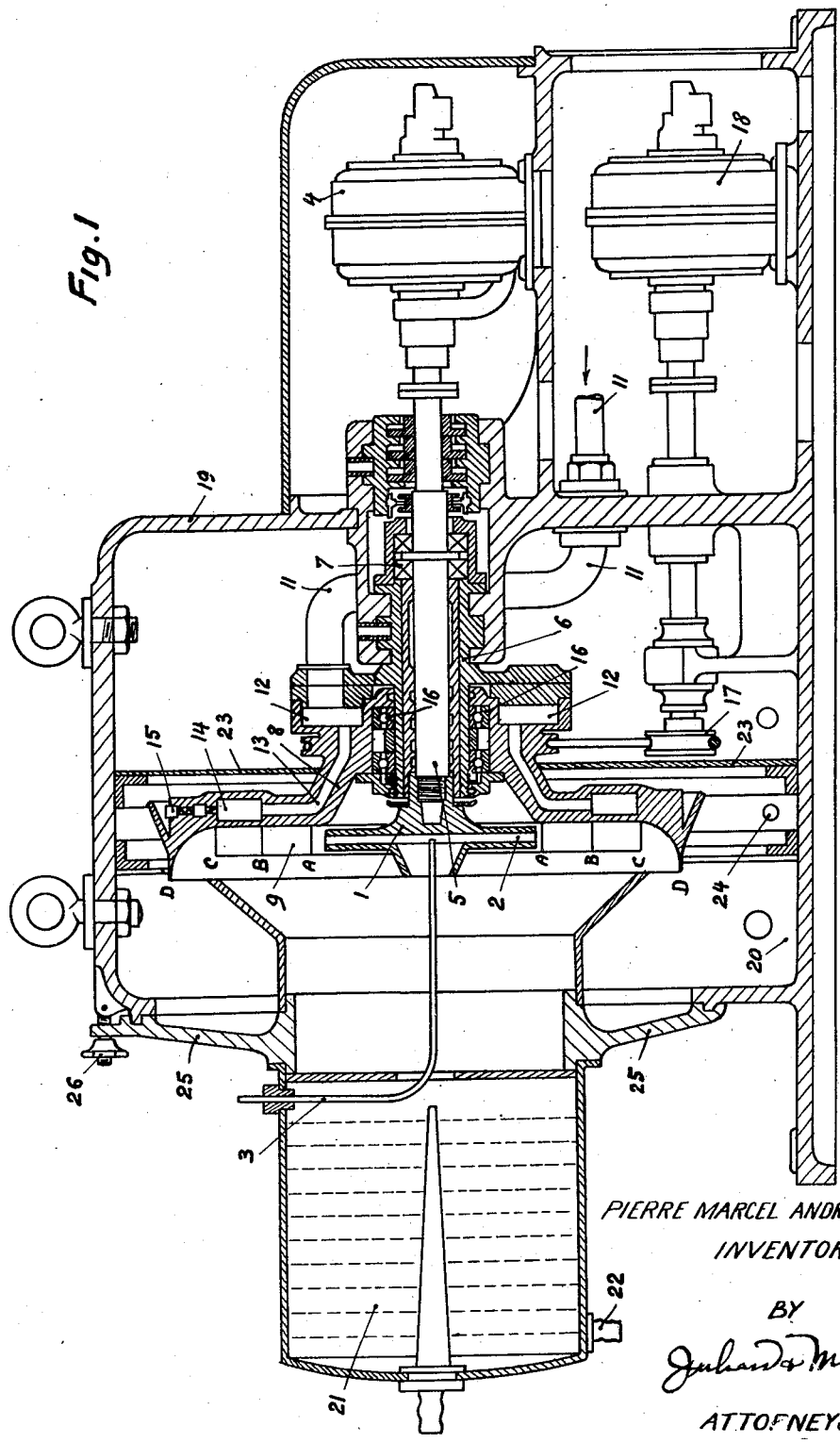
PIERRE MARCEL ANDRÉ LEUTE
INVENTOR
BY
ATTORNEYS

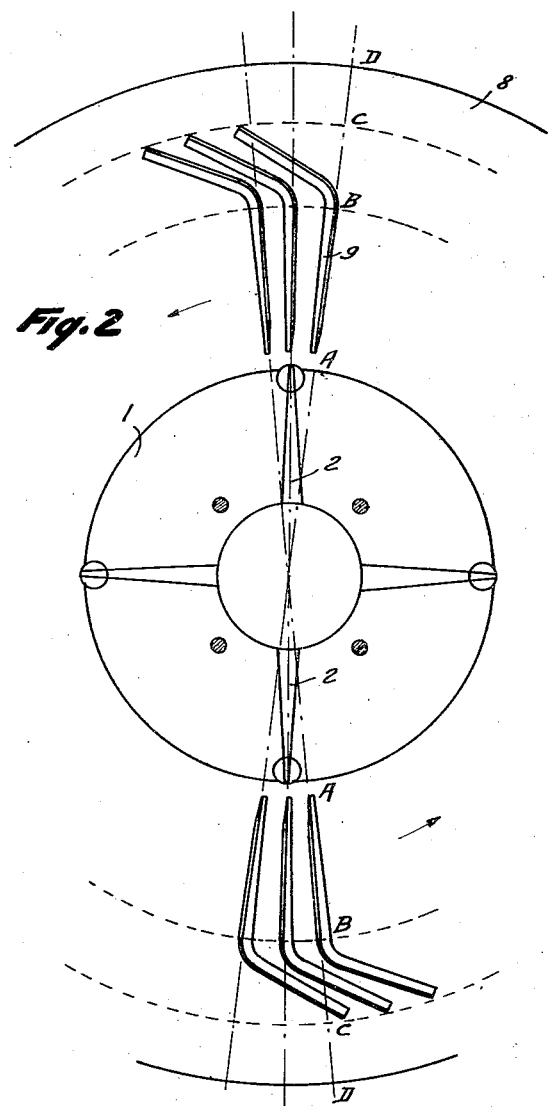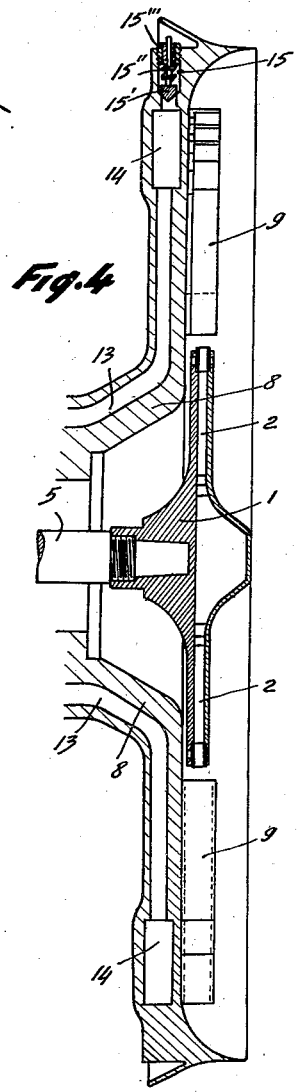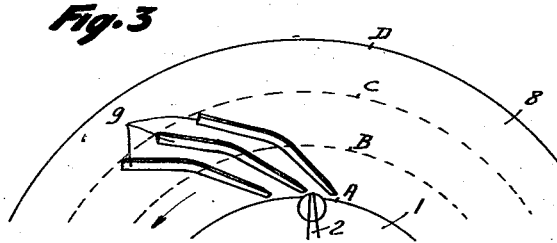

April 16, 1935.　　　P. M. A. LÉAUTÉ　　　1,997,937
APPARATUS FOR THE THERMIC TREATMENT OF PULVERIZED LIQUIDS OR SEMILIQUIDS
Filed April 7, 1933　　　3 Sheets-Sheet 3
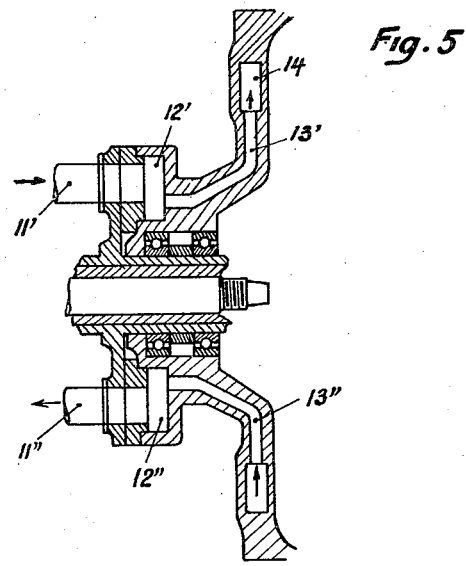
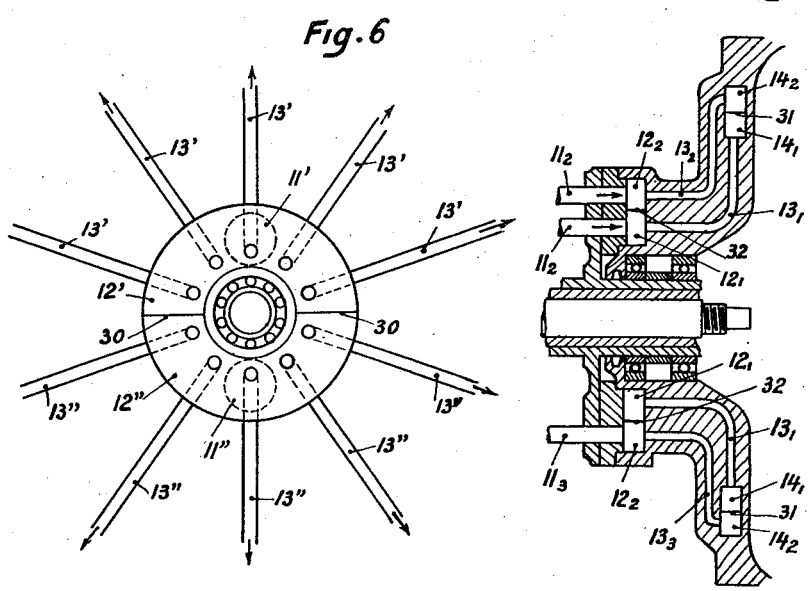
PIERRE MARCEL ANDRÉ LEUTE
INVENTOR
BY *Julian + Mencher*
ATTORNEYS Patented Apr. 16, 1935

1,997,937

UNITED STATES PATENT OFFICE 1,997,937

APPARATUS FOR THE THERMIC TREATMENT OF PULVERIZED LIQUIDS OR SEMILIQUIDS

Pierre Marcel André Léauté, Puteaux, France, assignor to Societe de Recherches & de Perfectionnements Industriels, Puteaux, France, a corporation of France Application April 7, 1933, Serial No. 665,025
In Germany February 7, 1933

8 Claims. (Cl. 159—6)

The present invention concerns an apparatus for the thermic treatment of liquids or semi-liquids (e. g. curdled milk) by evaporation, refrigeration or congelation, particularly applicable to the food industry, as in the manufacture of condensed milk, milk in powder form, concentrated meat extract, blood powders and similar preparations.

It is known that the usual devices employed for this treatment generally comprise an apparatus for pulverizing the liquid into extremely small particles—of a diameter of less than 50 microns—in order to increase the surface of the liquid which comes into contact with the agent of thermic treatment, and to reduce to a minimum the duration of this contact (this duration is reduced practically to a fraction of a second), so as to avoid the alteration of organoleptic properties of treated liquid; this very fine pulverization, or atomization, is obtained either by compression and expansion by passing the liquid, under pressure, through a very small aperture, or by centrifugal force. The liquid thus treated is led to the centre of a disc revolving at high speed generally supplied by a certain number of radial drainage channels.

The liquid thus pulverized is projected either on to a wall brought to a suitable temperature, or across a chamber in which is circulated, normally in the course of the liquid particles, a current of gas, hot air, for instance, (previously freed from its impurities, by suitable filters, in order to avoid the contamination of the treated product).

These two processes present numerous difficulties, which are as follows:—

In the case of the use of a hot wall (or cold) the liquid particles, carried at great speed, (in the region of 250 metres per sec.) rebound from the said wall, with the result that (1) the particles do not remain in contact with the wall and (2) this rebounding may cause the reunion of several particles, so that the desired duration of treatment may not be sufficient for these larger particles.

The use of hot (or cold) gas, although being much superior to the preceding method, nevertheless presents the following difficulties:—

(1) Since the liquid particles must be completely treated before reaching the walls of the treatment chamber, the latter must have large dimensions, on account of the great speed of the particles, and notwithstanding the braking effect exercised by the gaseous current on these particles. This results in a high cost of the installation, increased still further by the necessity for ventilators, heating batteries, filters, etc.

(2) The employment of an intermediate fluid, i. e. of gas or of air heated or cooled in special batteries, is the cause of poor thermic output. For example, in order to obtain a suitable consumption of steam per unit of weight of evaporated water, it is necessary to previously concentrate the liquid in a vacuum.

(3) This process does not permit of working in a vacuum, which does not offer every guarantee from a bacteriological standpoint, since the contamination of the food products by the gas used for treatment is always possible, however well filtered this gas may be. Moreover, the treatment gas can have a chemical action upon the product treated. Thus, the hot air may oxidize the fatty material in the milk products and render them sour.

(4) This process can only be practically applied when the final product is a powder, i. e. formed by solid particles, obtained, for example, by desiccation or congelation.

The object of this invention is to remedy all these inconveniences and is characterized by the fact that the pulverized liquid is brought into contact with a wall to which a rapid rotary movement is imparted and inclined in such a manner, in relation to its rotatory axis, that the particles of the pulverized liquid are forced against it by centrifugal force and travel slowly over the length of this wall, without being able to leave it during the treatment.

The invention is illustrated by way of example in the accompanying drawings showing an embodiment of the invention more particularly designed for the concentration, by evaporation, of liquids or semi-liquids (e. g. curdled milk). For the rest, it will be seen that the same apparatus can be employed, without modification, for other thermic treatments, such as refrigeration or congelation.

Figure 1 is a vertical longitudinal section of the general arrangement of the apparatus.

Figure 2 is a front elevation, on a large scale, of part of the pulverization apparatus and of the revolving walls used in the treatment.

Figure 3 is a variation of the apparatus shown in Figure 2.

Figure 4 is an axial section, likewise on a larger scale, of pulverization and treatment members.

Figure 5 is an axial section of a variation of the apparatus shown in Figure 4.

Figure 6 is a front elevation of the apparatus shown in Figure 5.

Figure 7 is an axial section of a further variation of the apparatus shown in Figure 4.

The apparatus consists of a pulverizing mechanism, or atomizer, of the centrifugal type, composed of a hollow disc 1, provided with a certain number of radial drainage channels 2, and receiving axially a jet of liquid to be treated, conducted through a pipe system 3, terminating in a suitable nozzle. The pulverizing disc is rotated directly by a turbine 4 at a speed which should be relatively higher if it is desired for the particles to be of smaller diameter. This speed varies, moreover, with the liquid to be treated and the extent of treatment. In certain cases, the use of an electric motor is more practicable than is a turbine. The shaft 5 is supported by a fixed hub 6. A stop 7 makes it possible to avoid longitudinal displacements of the shaft.

The pulverizing disc is revolved at a speed in the region of 12,000 revolutions per minute.

Behind the pulverizing disc 1 is disposed another disc rotating on the same shaft as the first, known as the treatment disc 8, mounted freely on the hub 6, by means of ball bearings 16. This treatment disc is revolved at a speed of approximately 1200 revolutions per minute, by a second turbine 18 (or an electric motor) through the medium of a belt, mounted on the pulley 17, keyed to the end of the turbine shaft. This disc 8 is flat in its central portion and has a widened edge which forms a cup, in the centre of which is disposed the puverizing disc 1.

In its flat central portion, the disc 8 carries, around the pulverizing disc 1, vanes 9, similar to those of a rotor of an hydraulic turbine and placed in the same vertical plane as the channels 2 of the atomizer, in order to receive and bring into the rotation of the disc 8, the liquid particles leaving the pulverization channels.

The face of the disc 8 carrying the vanes 9 will preferably be divided into three distinct zones (Figs. 2 and 3).

(1) A receiving zone AB intended to collect the liquid particles projected by the atomizer before they have reached the exterior region at the circle passing through the point B. It should be mentioned that different angles can be used for the vanes in this zone AB. In fact, when the particles are projected, visibly following tangential directions on the pulverizing disc 1, greater or lesser impact will result between the particles and the vanes according as these vanes make a greater or lesser angle with the tangents on the disc 1. (It should be noted that in this zone where the particles are simply collected by the vanes without being subjected to thermic treatment, this impact causes no difficulty; on the contrary, they produce, in certain cases, an additional pulverization.) Use can be made of this impact to help the revolving of the disc 8, by arranging the vanes radially in the zone AB, as is shown in Fig. 2, or by inclining the vanes in relation to the radius so as to lessen this impact, as shown in Figure 3.

In cases where the treated liquid could give rise to undesirable projections, the region AB in which the vanes function may be covered by a protecting plate.

(2) A treatment zone BC, in which the vanes are inclined in relation to the radius of the disc, so that the normal component, in the direction of the vane, of the centrifugal force due to the rotation of the disc 8, applies these particles against the vane-wall, by exerting upon the said particles a strong braking action. It will be indicated hereinafter in what manner the pulverized liquid particles are submitted, in this region BC, to a thermic treatment.

(3) A projection zone CD, comprising the widened edge in the form of a cup of the disc 8, by means of which the particles thermically treated in BC are ejected into the circular collecting channel 10.

In the body of the treatment disc 8 (Figures 1 and 4) is disposed, opposite the treatment crown BC, a circular chamber 14, into which open a certain number of channels 13, originating in a circular gullet 12, situated in the hub of the disc 8. The steam required for heating this chamber is brought to the disc 8 by means of a pipe system 11; arriving in this chamber 14, the steam heats the rear wall of the region BC of the vanes 9 through the medium of the wall of the disc 8. The condensation water from the heating steam is expelled by a number of purifiers 15 disposed at regular intervals over the exterior periphery of the chamber 14. Each of these purifiers is constructed by a cylindro-conical valve 15' controlled by a spring 15'', the tension of which can be regulated by means of a milled stud 15'''. Impelled by centrifugal force, the condensation water exerts a pressure on the valve 15', which, when a sufficient quantity has been collected, is forced to open. The purifiers 15 project the condensation water against the wall 23, along which it streams before being expelled through 24.

The function of the machine is as follows:

Once the discs are set in motion in the direction of the arrows in Figures 2 and 3, the liquid brought through the pipe 3 is pulverized by the disc 1, and, re-collected by the vane chambers 9, it then travels comparatively slowly along the inclined wall of the region BC, brought to the desired temperature. The duration of the displacement of the particles along this wall depends, at a given speed of the vaporizing disc 1, upon the strength of the normal component force of centrifugal force at the said wall.

The rotary speed of the disc 8 and the inclination of the treatment zone are chosen in such a manner that the duration of the travel of the particles is sufficient for the treatment to be carried out normally.

The concentrated liquid particles, expelled into the circular collector channel 10, collect, by force of gravity, at 20 in the lower part of the apparatus, whence they are expelled by pumping, while the vapours from the evaporated liquid condense in the mixing condenser 21.

A pump, connected to an inlet in the condenser 22, sucks up the liquids and incondensible gases.

The principal parts of the apparatus, i. e. the pulverizing member and the treatment disc, are contained in a tight casing 19. A vacuum can be set up in this casing, so that it is possible to proceed effectively with a concentration or desiccation in a vacuum.

Vacuum joints are provided at the steam entrance in the treatment disc and at the crossing of the wall of the casing 19 by the two turbine shafts.

The circular channel 10, and the condenser 21, are fixed to a bracket 25 mounted on a joint and maintained in working order against the casing by screws 26. When it is required to clean the interior of the apparatus, it is sufficient to open this bracket and the parts of the apparatus which have come into contact with the treated liquid, viz the two discs, and the circular channel, immediately become accessible and can thus be cleaned in a particularly short time.

The action as evaporator of the apparatus forming the object of the invention has been described above. However, the same apparatus lends itself, without modification, to other treatments, such as refrigeration or congelation. In this case, it is sufficient to introduce through the pipe system 11, in the disc 8, either brine or cold gas. If brine is used, it is expelled from the chamber 14 by purifiers 15 in the same manner as was the condensation water from the heating steam. If, however, refrigeration is undertaken by expansion of gas, it is necessary to provide (Figs. 5 and 6) two pipe systems 11' and 11'' for the feeding and for the return of the used gas, the pipes 13' and 13'' serving alternately to admit and to return the said gas. For this purpose the annular chamber 12 is divided into two semicircular compartments 12' and 12'' by means of a diametrical partition 30, each of the compartments 12', 12'' being connected during one half-turn to the admitting pipe system 11' and during the following half-turn, to the evacuation pipe 11''.

Lastly, the apparatus lends itself to a treatment comprising an evaporation, followed by refrigeration. The chamber 14 (Fig. 6) is then divided into two concentric compartments 14₁— 14₂ by the use of a cylindrical insulating partition 31, the heating steam being led into the first compartment 14₁, and the refrigeration fluid into the second compartment 14₂, separate admitting pipes 11₁, 11₂, 13₁, 13₂ being provided respectively for the two fluids, and chamber 12 being for this purpose divided into two concentrical chambers 12₁ and 12₂ by means of the cylindrical insulating partition 32. In order to avoid mixing the brine and condensation water, the expansion of a gas is used for refrigeration the used gas being evacuated through pipes 13₃ and 11₃, chamber 12₂ being for this purpose constituted as described above in relation with Figs. 5 and 6.

All these operations can be carried out in a vacuum through the air-tight casing 19, thus eliminating all risk of contamination of the treated product by the air.

The advantages of the apparatus forming the object of this invention are numerous. The following should more particularly be mentioned:—

1. The apparatus provides, due to its high speed, a very great output although its general dimensions are small. It also does not necessitate any costly accessories.

2. The thermal efficiency is high owing to the absence of intermediate fluids and to the possibility of using vapours at high pressures and temperatures.

3. The apparatus ensures an almost instantaneous treatment to be obtained so that the organoleptic properties of the product are not modified.

4. Since the treatment may be done under vacuum, it is possible to carry out the evaporation at low temperature without resorting to a subsequent cooling down, and, on the other hand, it is possible to preserve completely the treated product from the risks of contamination through the air.

5. The final product may be obtained in any desired form: solid, liquid or pasty.

6. Certain products, such as serums, which it is impossible to treat in the current apparatus because they give rise to a great quantity of foam, are treated without any difficulties in the apparatus object of the invention.

7. The cleaning of the apparatus is easily and rapidly done.

Having now described my invention, what I claim and desire to secure by Letters Patent is:

1. Apparatus for the treatment of liquids by evaporation, thermic treatment and congelation, comprising in combination means for pulverizing and projecting the treated liquid in very fine particles, a wall on which the liquid is projected, means for regulating the temperature of this wall, means for rotating said wall at a very high speed, said wall being inclined on the direction of the centrifugal force in such a manner that the normal component of said force to said wall applies the particles strongly against the wall and that the tangential component of the centrifugal force causes said particles to travel relatively slowly along the wall.

2. Apparatus for the treatment of liquid by evaporation, thermic treatment and congelation, comprising in combination a pulverizing device constituted by a disc adapted to receive the liquid at its centre and provided with radial pulverization channels, a second disc coaxial with the first disc, means for rotating this second disc at a very high speed, on said second disc vanes adapted to receive the particles of the pulverized liquid projected by the first disc, said vanes being disposed concentrically to the pulverizing disc and having their external part inclined to the radial in such a manner that the component of the centrifugal force normal to the wall of that part of the vane strongly applies the particles against that wall and that the tangential component causes said particles to travel relatively slowly along the wall, means for regulating the temperature of said vanes.

3. Apparatus for the treatment of liquid by evaporation, thermic treatment and congelation, comprising in combination a pulverizing device constituted by a disc adapted to receive the liquid at its centre and provided with radial pulverization channels, a second disc coaxial with the first disc, means for rotating this second disc at a very high speed, on said second disc vanes adapted to receive the particles of the pulverized liquid projected by the first disc, said vanes being disposed concentrically to the pulverizing disc and having their external part inclined to the radial in such a manner that the component of the centrifugal force normal to the wall of that part of the vanes strongly applies the particles against the wall and that the tangential component causes said particles to travel relatively slowly along the wall, inside said second disc a circular chamber situated in front of the inclined part of said vanes, a series of channels situated in this second disc and opening into the said circular chamber, means for feeding these channels with a fluid at the desired temperature.

4. Apparatus for the treatment of liquid by evaporation, thermic treatment and congelation, comprising in combination a pulverizing device constituted by a disc adapted to receive the liquid at its centre and provided with radial pulverization channels, a second disc coaxial with the first disc, means for rotating this second disc at a very high speed, on said second disc vanes adapted to receive the particles of the pulverized liquid projected by the first disc, said vanes being disposed concentrically to the pulverizing disc and having their external part inclined to the radial in such a manner that the component of the centrifugal force normal to the wall of that part of the vanes strongly applies the particles against the wall and that the tangential component causes said particles to travel relatively slowly along the wall, inside said second disc a circular chamber situated in front of the inclined part of said vanes, a series of channels situated in this second disc and opening into the said circular chamber, means for conducting heating steam into said chamber, spring controlled valves disposed on the periphery of said circular chamber for evacuating the condensation water from the heating steam under the influence of the centrifugal force.

5. Apparatus for the treatment of liquid by evaporation, thermic treatment and congelation, comprising in combination a pulverizing device constituted by a disc adapted to receive the liquid at its centre and provided with radial pulverization channels, a second disc coaxial with the first disc, means for rotating this second disc at a very high speed, on said second disc vanes adapted to receive the particles of the pulverized liquid projected by the first disc, said vanes being disposed concentrically to the pulverizing disc and having their external part inclined to the radial in such a manner that the component of the centrifugal force normal to the wall of that part of the vanes strongly applies the particles against the wall and that the tangential component causes said particles to travel relatively slowly along the wall, inside said second disc a circular chamber situated in front of the inclined part of said vanes, a series of channels situated in this second disc and opening into the said circular chamber, means for conducting refrigerating liquid into said chamber, spring controlled valves disposed on the periphery of said circular chamber for evacuating the refrigerating liquid under the influence of the centrifugal force.

6. Apparatus for the treatment of liquid by evaporation, thermic treatment and congelation, comprising in combination a pulverizing device constituted by a disc adapted to receive the liquid at its centre and provided with radial pulverization channels, a second disc coaxial with the first disc, means for rotating this second disc at a very high speed, on said second disc vanes adapted to receive the particles of the pulverized liquid projected by the first disc, said vanes being disposed concentrically to the pulverizing disc and having their external part inclined to the radial in such a manner that the component of the centrifugal force normal to the wall of that part of the vanes strongly applies the particles against the wall and that the tangential component causes said particles to travel relatively slowly along the wall, inside said second disc a circular chamber situated in front of the inclined part of said vanes, a series of channels situated in this second disc and opening into the said circular chamber, means for feeding these channels with cold expanded gas, a second series of channels in the second disc opening likewise into the said circular chamber and adapted for the evacuation of the cold gas.

7. Apparatus for the treatment of liquid by evaporation, thermic treatment and congelation, comprising in combination a pulverizing device constituted by a disc adapted to receive the liquid at its centre and provided with radial pulverization channels, a second disc coaxial with the first disc, means for rotating this second disc at a very high speed, on said second disc vanes adapted to receive the particles of the pulverized liquid projected by the first disc, said vanes being disposed concentrically to the pulverizing disc and having their external part inclined to the radial in such a manner that the component of the centrifugal force normal to the wall of that part of the vanes strongly applies the particles against the wall and that the tangential component causes said particles to travel relatively slowly along the wall, inside said second disc a circular chamber situated in front of the inclined part of said vanes, in this circular chamber a cylindrical partition which divides said chamber into two concentric compartments, means for feeding one of said compartments with a heating fluid, means for feeding the other compartment with a refrigerating fluid.

8. Apparatus for the treatment of liquids by evaporation, thermic treatment and congelation, comprising a tight casing, means for maintaining vacuum in this casing, in said casing a pulverizing device, constituted by a disc adapted to receive the liquid at its centre and provided with radial pulverizing channels, a second disc coaxial with the first disc and provided with a widened edge in the form of a cup, means for rotating said second disc at a very high speed, in the flat portion of said second disc vanes adapted to receive the particles of the pulverized liquid projected by the first disc, said vanes being disposed concentrically to the pulverizing disc and having their external part inclined to the radial in such a manner that the component of the centrifugal force normal to the wall of that part of the vanes strongly applies the particles against that wall and that the tangential component causes said particles to travel relatively slowly along the wall, means for regulating the temperature of said vanes, a circular chamber disposed in the tight casing for receiving the particles expelled by the second disc, and means for expelling these particles to the outside of the casing.

PIERRE MARCEL ANDRÉ LÉAUTÉ.